United States Patent
Jacob

(10) Patent No.: US 7,066,030 B2
(45) Date of Patent: Jun. 27, 2006

(54) PRESSURE-MEASURING CONFIGURATION, WITH A THROUGHPLATING THROUGH A SEPARATOR LOCATED BETWEEN A DIAPHRAGM AND A BASE, AS WELL AS A PROCESS FOR PROVIDING THE ELECTRICAL CONTACT

(75) Inventor: Joern Jacob, Wolfach-Kirnbach (DE)

(73) Assignee: Vega Grieshaber KG, Wolfach (DE)

(*) Notice: Subject to any disclaimer, the term of this patent is extended or adjusted under 35 U.S.C. 154(b) by 0 days.

(21) Appl. No.: 10/837,907

(22) Filed: May 4, 2004

(65) Prior Publication Data
US 2004/0250627 A1 Dec. 16, 2004

(30) Foreign Application Priority Data
May 8, 2003 (DE) ............... 103 20 478

(51) Int. Cl.
*G01L 7/08* (2006.01)
(52) U.S. Cl. ............................................. 73/715
(58) Field of Classification Search ........... 73/715, 73/724, 723, 204.22; 438/558; 174/25 R, 174/25 C, 25 P, 263, 265; 439/200
See application file for complete search history.

(56) References Cited

U.S. PATENT DOCUMENTS

| | | | | |
|---|---|---|---|---|
| 3,952,234 | A * | 4/1976 | Birchall | 361/283.4 |
| 4,839,700 | A * | 6/1989 | Ramesham et al. | 361/500 |
| 5,544,399 | A * | 8/1996 | Bishop et al. | 29/25.41 |
| 5,561,247 | A * | 10/1996 | Mutoh et al. | 73/724 |
| 5,836,063 | A * | 11/1998 | Hegner et al. | 29/25.42 |
| 5,983,727 | A * | 11/1999 | Wellman et al. | 73/724 |
| 6,184,096 | B1 * | 2/2001 | Lee et al. | 438/298 |
| 6,267,009 | B1 * | 7/2001 | Drewes et al. | 73/718 |
| 6,488,199 | B1 * | 12/2002 | Schwaiger et al. | 228/122.1 |
| 6,536,287 | B1 * | 3/2003 | Beekhuizen et al. | 73/718 |
| 6,578,427 | B1 * | 6/2003 | Hegner | 73/724 |
| 2004/0104114 | A1 * | 6/2004 | Schulte et al. | 204/426 |
| 2004/0206829 | A1 * | 10/2004 | Welling et al. | 235/492 |

FOREIGN PATENT DOCUMENTS

| | | |
|---|---|---|
| DE | 42 31 120 A1 | 3/1994 |
| DE | 4231120 C2 | 3/1994 |
| DE | 100 52 053 A1 | 4/2002 |
| WO | WO 02/33372 A1 | 4/2002 |

* cited by examiner

*Primary Examiner*—Edward Lefkowitz
*Assistant Examiner*—George P Bonanto
(74) *Attorney, Agent, or Firm*—Nath & Associates PLLC; Gregory B. Kang; Teresa M. Arroyo

(57) ABSTRACT

Process for contacting diaphragm electrode (6) for pressure-measuring configuration. Connection of diaphragm (3) on which diaphragm electrode (6) is positioned to base (1) by connecting element (2) made of electrically insulating material running between the two. Base exhibits throughplating hole (7, 10) between attachment point (8) and connecting point (9) for electrically insulating material, and connecting element (2) exhibits connecting element throughplating (11) between connecting point (9) and diaphragm or diaphragm electrode. Conductive contact material (13) is provided in throughplating hole (7, 10). Contact material (13) is activated by heating. Throughplating (11) is prepared through connecting element (2) without forming opening that weakens material and without needing to align diaphragm, connecting element, and base with respect to throughplating holes. Contact material (13) is a material from which ions penetrate insulating material upon heating and render insulating material conductive to form connecting element throughplating (11).

9 Claims, 1 Drawing Sheet

Figure 1A:
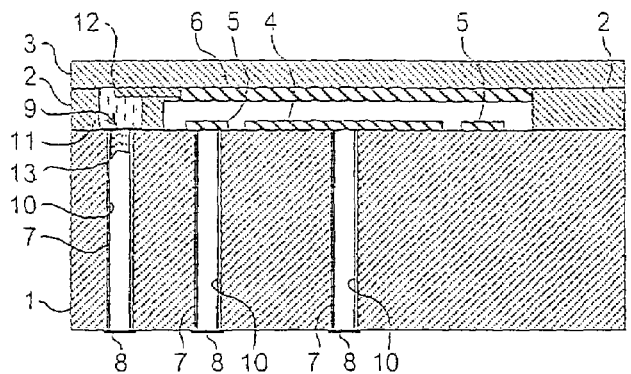

PRESSURE-MEASURING CONFIGURATION, WITH A THROUGHPLATING THROUGH A SEPARATOR LOCATED BETWEEN A DIAPHRAGM AND A BASE, AS WELL AS A PROCESS FOR PROVIDING THE ELECTRICAL CONTACT

The invention relates to a process for a contacting a diaphragm electrode to the base of a pressure-measuring configuration exhibiting the features of the preamble of claim 1, and relates to a pressure-measuring configuration with the features of the preamble of patent claim 6.

There are generally known pressure-measuring configurations, equipped with capacitive measuring cells, where a capacitance is measured between electrode areas and the electrode surfaces lie opposite one another, are spaced at a given distance, and are electrically insulated from each other. This kind of pressure-measuring configuration is shown in a lateral cross-section in FIG. 2A and in a top view cross-section through a connecting element of the same configuration in FIG. 2B. Positioned on one side of the base 1 is at least one electrode 4, 5, which forms one of two electrode areas. A spacer is positioned in the circumferential area of this side of the base; the spacer takes the form of an electrically insulating material made of glass solder and serves as a distancing and connecting element 2. Positioned on this connecting element 2 is a diaphragm 3, on whose lower side a diaphragm electrode 6 is positioned; this diaphragm electrode 6 forms the second electrode area. To connect the electrodes 4–6 with appropriate attachment points 8 for the external supply of voltage to electrodes 4–6, tubular base throughplatings 7 run through the base 1. The wall material of these throughplatings 7 is usually electrically conductive. To connect the diaphragm electrode 6, a throughplating hole 11a also runs through the connecting element 2. In the course of joining diaphragm 3, connecting element 2, and base 1, it is necessary to precisely align this throughplating hole 11a in the connecting element 2 with the corresponding base throughplating hole 7 below it. This requires additional work steps, e.g., providing the base 1 and the connecting element 2 with previously applied markings, as well as aligning these components. After a secure connection is achieved between the diaphragm 3, the connecting element 2, and the base 1, a conducting material, e.g., conductive cement or conductive paste, is packed into the base throughplating hole 7 and also in the connecting element throughplating hole 11a, in order to bridge the section between the diaphragm 3 and the base 1, and thus to form an electrical connection between the diaphragm 3 and its diaphragm electrode 6, on the one side, and the corresponding base throughplating 7, on the other. In a subsequent procedural step the paste is burned in or the cement allowed to harden.

This kind of a pressure-measuring configuration, as well as its manufacture, are disadvantageous due to the large number of procedural steps called for, particularly the marking and alignment of the individual elements. The connecting element throughplating hole 11a also represents a mechanical weak point in the connecting element 2.

The goal of the invention is to provide an improved process for contacting a diaphragm electrode to the base of a pressure-measuring configuration and to provide a pressure-measuring configuration with a simpler design.

This goal is achieved in a process for contacting a diaphragm electrode to the base of a pressure-measuring configuration with the steps indicated in patent claim 1 and is achieved in a pressure-measuring configuration with the features of patent claim 6.

In the process for contacting a diaphragm electrode to the base of a pressure-measuring configuration, a number of manufacturing steps are successively performed in a manner known to the prior art. Thus a diaphragm to which the diaphragm electrode is attached is connected to the base by means of a connecting element made of an electrically insulating material; here the base exhibits a throughplating hole which runs between a point of connection with the electrically insulating material of the connecting element and an attachment point for drawing voltage for the electrodes. In addition, the connecting element exhibits a connecting element throughplating between the connecting point on the base and the diaphragm, or diaphragm electrode. If the diaphragm, connecting element, and base are connected by heating and, as the case may be, by melting of the connecting element, the next step is to provide a conductive contact material in the base throughplating hole. Also possible, however, is the direct use of a base whose base throughplating hole has already been provided, or filled, with this kind of conductive contact material. In accordance with the process, the contact material employed is a material whose ions—upon activation of the material, and particularly upon heating of the material—penetrate the electrically insulating material and render it conductive in the given section, and thereby form a throughplating to the diaphragm. Here the penetration can be through diffusion and migration. Thus a pressure-measuring configuration exhibits a connecting element throughplating consisting of an electrically conductive section with conductive ions in the otherwise electrically insulating material.

Advantageous embodiments constitute the subject matter of dependent claims.

The electrically insulating material will advantageously consist of glass, particularly glass which has been solidified by hardening from glass solder employed in the assembly and will assume not only the function of the connecting element for the secure attachment of the diaphragm and base, but will also assume the function of a separator.

The contact material will preferably consist of a paste containing silver, particularly silver paste or silver-palladium paste, which hardens through heating and, in the process, emits ions into the adjacent material of the connecting element. The contact material will advantageously be packed into the base throughplating hole after the diaphragm, the insulating material as connecting element, and the base have solidified, so that a controlled reaction can be triggered by appropriate heating. Prior insertion is also possible, of course—particularly if the diaphragm, the connecting element, and the base are glued together and there is no prior excess heating.

During heating it is advantageous to apply power to a field, specifically an electrical or electromagnetic field, in order to support the penetration of ions from the contact material into the electrically insulating material in a specific direction.

An exemplary embodiment is next described on the basis of a drawing, which shows:

FIG. 1A a lateral cross-section through a pressure-measuring configuration

Figure 1B:
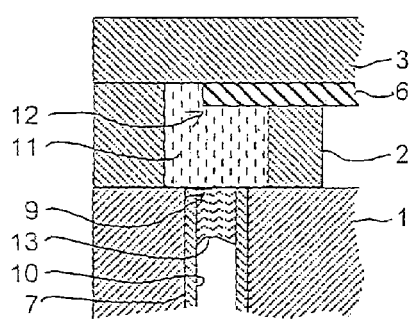

FIG. 1B an enlarged segment of the above

Figure 2B:
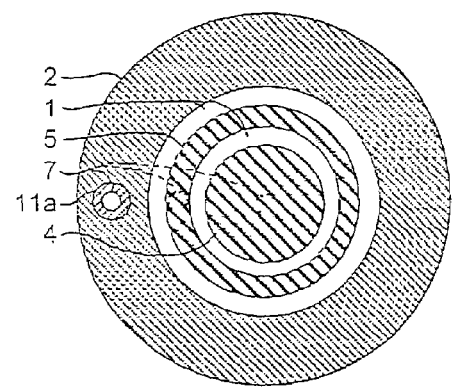
Figure 2A:
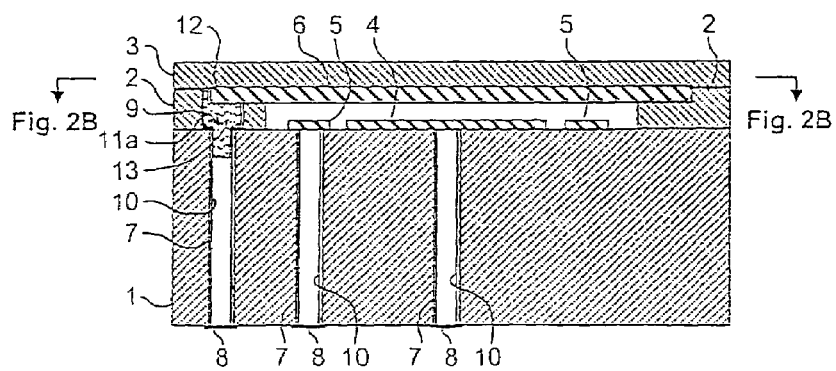

FIG. 2A a lateral cross-section through a configuration from the prior art

FIG. 2B a cross-section through a connecting element on a plane perpendicular to the depiction of 2A.

FIGS. 1A and 1B show a cross-section, or a segment thereof, for a preferred sensor; FIG. 1B shows a slightly modified embodiment. The preferred embodiment has a cylindrical cross-section similar to the sensor shown in 2B.

Shown is a capacitive measuring cell for recording pressure, in which the capacitance, dependent on the applied pressure, between two facing, separated, and insulated electrode areas is determined. In the exemplary embodiment that is depicted the first electrode area, in the form of a diaphragm electrode 6, is located on the inside face of a diaphragm 3 that is sensitive to pressure. The second electrode area is positioned on the inside face of a base 1. Inside refers here to a position in the space between the diaphragm 3 and the base 1. The diaphragm 3 and the base 1 are positioned at a distance from each other and consist of a non-conducting material.

The diaphragm 3 and the base 1 are joined by a connecting element 2, which in addition to serving to connect also functions as a distancing element. The connecting element 2 will advantageously consist of glass, which is formed from glass solder and which creates an undetachable and insulating connection between the diaphragm 3 and the base 1.

Other electrodes can also be positioned on the top of the base 1 and to the diaphragm 3. Depicted on the surface of the base 1 is a reference electrode 5, which encircles at a distance the circular measuring electrodes 4. To attach the electrodes 4–6, appropriate attachment points 8 are formed on the side of the base 1 opposite the electrodes 4, 5. The electrodes 4–6 consists of a material with good conductive properties, particularly gold. These attachment points may serve, e.g., as solder pads or as other conventional pick-ups for connecting the pressure sensor to, e.g., an electronic evaluating unit. The electrical connection between the attachment points 8 and the corresponding electrodes 4–6 is created by means of throughplatings 7, which run through the base 1. A simple conductor may suffice to connect the measuring electrode 4 and the reference electrode 5. However, in the depicted exemplary embodiment the measuring electrode 4 and the reference electrode 5 are connected by way of tubular throughplating holes 7. Here the throughplating holes 7 have a conductive wall 10 for creating an electrical connection between the attachment point 8 and the corresponding electrode 4 or 5.

To attach the diaphragm electrode 6, a throughplating hole 7 also runs through the base 1, from an attachment point 8 to a connecting point 9 between the base 1 and the connecting element 2. Here the connecting element 2 consists of an insulating material, particularly a glass body produced from glass solder. On the side of the connecting element 2 which lies opposite the connecting point 9 to the base 1 there is an attachment point 12, located between the connecting element 2 and the diaphragm 3. As depicted in the exemplary embodiment of FIG. 1A, this attachment point 12 consists of an electrically conductive contact element, which forms and produces an electrical connection to the diaphragm electrode 6. In the exemplary embodiment shown in FIG. 1B this attachment point is formed directly by the diaphragm electrode 6, which extends into the area of the attachment point 12.

In order to create an electrical connection between the connecting point 9 and the attachment point 12 and through the otherwise insulating connecting element 2, the creation of the pressure sensor requires that a contact material 13 be provided in the throughplating hole 7. Depending on manufacturing steps that are necessary before and after, this will occur before or after the base, the connecting element 2, and the diaphragm 3 have been assembled and after the connecting element 2 has hardened, e.g., through intense heating of glass solder.

The contact material 13 consists of a material that releases ions into the adjacent material of the connecting element 2 after suitable activation. The preferred contact material 13 is a paste containing silver, particularly silver paste or silver-palladium paste, which upon heating allows intensified migration of silver ions into the material of the connecting element 2, e.g., into the preferred glass or glass solder. The material of the connecting element 2, which otherwise has an insulating effect, consequently becomes conductive in the area between the connecting point 9 on the base 1 (in the direction of the connecting element 2) and the attachment point 12 on the diaphragm 3 (in the direction of the connecting element 2). A continuous electrical contact is thus formed from the external attachment point 8 via the conductive wall material 10 of the throughplating hole 7, the area of the connecting point 9 between the base 1 and the throughplating 11 thus produced, through the remaining solid body of the connecting element 2, up to the attachment point 12 between the connecting element 2 and the diaphragm 3, and on to the diaphragm electrode 6.

In place of the recess in the glass solder connection, or in the glass body of the connecting element 2, as in the prior art, the preferred exemplary embodiment exhibits no such material weakness in the connecting element 2, as caused by a passage (11a in FIG. 2A), or a passage subsequently filled with a contact material. In particular, the assembly can take place without a special alignment of the diaphragm 3, connecting element 2, and base 1 with respect to the throughplating holes. This results in less work in the manufacturing process and fewer stages, and therefore in reduced costs. In addition, the mechanical weak point in the connecting element 2 is eliminated, inasmuch the material of the connecting element 2, with its otherwise insulating property, is rendered locally conductive by ion migration from the contact material 13 during a heating process.

To promote the penetration, particularly the migration or diffusion, of the conductive ions from the contact material 13 into the adjacent insulating material of the connecting element 2, it is possible during activation—specifically, heating of the contact material 13—to additionally apply an electrical or electromagnetic field to the pressure-measuring device—one which specifically takes effect on the conductive ions in the desired area of the contact material 13 and of the connecting element throughplating that is being created.

Whereas the exemplary embodiment shown in FIG. 1A depicts a throughplating hole 7, 10 through the base 1, it is also possible to produce a base 1 in which a large electrical cable leads to a reception space for the contact material 13. For example, the reception space can be a recess in the surface area of the base 1, which will lie opposite the connecting element after assembly.

Particularly in the case of a diaphragm 3 exhibiting a diaphragm electrode 6, or a corresponding attachment 12 for the diaphragm electrode 6, which extend spatially into the contact area of the connecting element throughplating 11, all three basic elements—the diaphragm 3, the connecting element 2, and the base 1—can be assembled without the need for any special alignment, whereupon the throughplating 11 through the connecting element 2 is created by activation of the contact material 13 after the secure connection of the basic elements.

LIST OF REFERENCE NUMERALS 1 base
2 electrically insulating connecting element
3 diaphragm
4 measuring electrode
5 reference electrode
6 diaphragm electrode
7 throughplating hole
8 attachment point, externally to 1
9 connecting point from 1 to 2
10 wall in 7/conductive wall material
11 connecting element throughplating/conductive glass section
11a connecting element throughplating hole
12 attachment point from 2 to 3/6
13 contact material

The invention claimed is:

1. A process for providing a contact for a diaphragm electrode (6) for a pressure-measuring configuration, comprising:
   connecting a diaphragm (3) on which the diaphragm electrode (6) is positioned to a base (1) by means of a connecting element (2) made of an electrically insulating material and running between the two,
   where the base (1) exhibits a throughplating hole (7, 10) between an attachment point (8) and a connecting point (9) leading to the connecting element (2), and
   the connecting element (2) exhibits a connecting element through contact (11) between the connecting point (9) and the diaphragm (3), or diaphragm electrode (6),
   filling a conductive contact material (13) in the throughplating hole (7, 10), and
   assembling, through solidification, by allowing the contact material (13) to heat up,
   wherein the contact material (13) employed is a material from which ions penetrate connecting element (2) upon activation, by heating, and render the connecting element (2) conductive while forming a connecting element through contact (11).

2. A process according to claim 1, in which the electrically insulating material employed in the connecting element (2) is glass solder.

3. A process according to claim 1, in which the employed contact material (13) is a silver paste or silver-palladium paste.

4. A process according to claim 1, in which upon activation of the contact material (13) an electrical or electromagnetic field, is applied over at least the area of the connecting element throughplating (11) to provide directed penetration of the ions.

5. A pressure-measuring configuration, comprising:
   a diaphragm (3),
   at least one electrode (6) positioned on the diaphragm (3),
   a base (1),
   a connecting element (2) made of an electrically insulating material between diaphragm electrode (6) and base (1),
   a base throughplating (7, 10) extending from an attachment point (8) on the base (1) to a connecting point (9) between the base (1) and the connecting element (2), and
   a connecting element throughplating (11) extending from an attachment point (12) on the diaphragm (3), or an electrode (6) on the diaphragm (3) and the connecting element (2), through the connecting element (2), to the connecting point (9) leading to the base (1),
   wherein the connecting element throughplating (11) is formed from heating an electrically conductive contact material (13) such that conductive ions penetrate the connecting element (2) which otherwise has an electrically insulating character.

6. A measuring configuration according to claim 5, in which the electrically insulating material of the connecting element (2) is hardened glass solder.

7. A measuring configuration according to claim 5, in which the base throughplating (7, 10) contains an electrically conductive contact material (13) which releases ions when activated, by heating.

8. A measuring configuration according to claim 7, in which the contact material (13) contains silver paste or silver-palladium paste.

9. A measuring configuration according to claim 7, in which the connecting element throughplating (11) exhibits ions originally deriving from the contact material (13).

* * * * *